United States Patent Office 3,107,207
Patented Oct. 15, 1963

3,107,207
PROCESS FOR THE PRODUCTION OF SHAPED
ARTICLES BY IRRADIATION
Emile Clement Cottet and Andre Claude Ducros, Lyon, France, assignors to Societe des Usines Chimiques Rhone-Poulenc, Paris, France, a corporation of France
No Drawing. Filed Nov. 17, 1958, Ser. No. 774,079
Claims priority, application France Nov. 16, 1957
4 Claims. (Cl. 204—154)

The present invention concerns a new process for the preparation of shaped objects based on polymerised substances.

Various means have already been proposed for producing such objects, notably sheets, tubes or strips. For example, the shaping of a thermoplastic polymer can be effected by pressure moulding or by passage through an extrusion press. It is also possible to mould, from viscous solutions of polymers, blocks which are thereafter subjected to various operations for the purpose of obtaining objects of more evolved form. Thus, for example, sheets of cellulose acetate can be produced. Another well known method of preparing shaped objects based on polymeric substances consists in subjecting a liquid polymerisable monomer to polymerisation in an enclosed space which it completely fills and the contours of which determine the shape of the polymerised object obtained. There may be prepared by this method, in particular, shaped polymerised objects based on polystyrene or acrylic or methacrylic polymers.

In the case of acrylic polymers, in particular, and more especially methyl polymethacrylate, it is known to obtain sheets of this polymer by the polymerisation at elevated temperature of monomeric methyl methacrylate contained in an enclosed space, the walls of which consist of glass sheets defining a rectangular parallelepiped of very small thickness. When the polymerisation is complete, the polished sheets constituting the larger faces of the rectangular parallelepiped are removed, and there is thus obtained a sheet of methacrylic polymer whose faces have the polish of the said glass plates.

The various methods heretofore employed for obtaining shaped objects some of which have been mentioned above, each have their particular field of application but also have their difficulties and disadvantages. Thus, in the polymerisation of acrylic derivatives in a mould, especially for the production of sheets, the difficulty arises that it is necessary to make the polymerisation chamber completely fluid-tight in order to avoid any escape of liquid. On the other hand, it is difficult to prevent the formation of bubbles in the polymerised mass in the course of the polymerisation. This process of polymerisation generally does not permit of preparing sheets of methyl methacrylate of a thickness less than 0.6 mm.

It is an object of the present invention to provide a new method for the preparation of shaped objects based on polymerised substances, the new method being one which can in many cases be advantageously substituted for the conventional methods referred to before and in some cases permits of procedures which were not heretofore practicable.

According to the present invention there is provided a process for the production of shaped articles of polymerised substances which comprises impregnating a crude or shaped stem polymer with a quantity of polymerisable monomer at least equal to the weight of the polymer, subjecting the softened mixture thus obtained, after shaping if not during shaping, to polymerisation at ambient temperature under the action of electromagnetic or ionising radiation.

This process is applicable especially to the manufacture of articles such as sheets, tubes and strips, and especially to the manufacture of sheets of methacrylic derivatives. The impregnation may be effected with the assistance of a non-polymerisable penetrating agent. The softened mixture may be shaped or reshaped before the polymerisation is effected. By means of the process the monomer is grafted on to the stem polymer.

It is known to graft polymerisable monomers on crude or shaped solid polymers but the process has heretofore been employed only with the object of modifying the surface of said polymers for the purpose of imparting particular properties thereto, which can generally be carried out with relatively small quantities of polymerisable monomer in relation to the mass of the stem polymer. In the process according to the present invention, the polymerisable monomer constitutes, on the contrary, a main and usually predominant element in the constitution of the finished product. Although the graft can be attached solely to the surface of the stem polymer, it is more advantageous to effect a homogeneous grafting by incorporation of the polymerisable monomer in the whole mass of the support polymer. The polymerisable monomer may be applied either in liquid form, for example by dipping the stem polymer into the liquid monomer or into a solution of the monomer in a non-polymerisable solvent, or by spraying the stem polymer therewith or otherwise by bringing the stem polymer into contact with vapours of the monomer, if desired mixed with vapours of non-polymerisable solvents compatible with the monomer and exerting on the polymer a penetrating action greater than that of the polymerisable monomer. The impregnation generally precedes the irradiation, but the two operations may also be carried out simultaneously.

The process according to the present invention is not limited to the use of particular stem polymers and polymerisable monomers. All the substances commonly called polymeric, including both derivatives of natural origin and artificial derivatives obtained by true polymerisation, poly-addition or poly-condensation, may be used within the scope of the invention. The polyvinyl esters of organic or mineral acids, polyvinyl alcohol, polyvinyl acetals, cellulose esters and regenerated cellulose may be particularly mentioned.

The polymerisable monomers to which the invention is specially applicable include monomers of the acrylic type and more particularly methyl methacrylate.

The radiation employed may be either ionising radiation such as that obtained with particle accelerators of known type or by bombardment of a metal plate with electrons of appropriate energy, or ionising electromagnetic radiation such as, for example, the radiation emitted by natural or artificial radioactive sources, notably cobalt 60.

In one embodiment of the invention, for example, a crude solid polymer may be swelled in an appropriate polymerisable monomer or a solution thereof, and the plastic mixture thus obtained may thereafter be subjected to moulding or passed through an extrusion press or a die, whereafter the irradiation of the shaped mixture may then be effected.

In accordance with another embodiment of the process of the invention, a previously shaped stem polymer may be impregnated with polymerisable monomer and the object thus treated may be introduced into the irradiation chamber. This method is particularly suitable for the production of sheets of plastic materials, such as polymethacrylic sheets, which have hitherto been prepared by polymerisation of the liquid monomer in vertical parallel faced chambers as described above. By the method of the present invention the required sheets may be prepared from sheets of plastic material which, as is known, can be obtained by simpler processes. The sheet of stem polymer serves as the fixing agent for the polymerisable monomer and obviates the difficulties in working with the latter in the fluid state. This method permits of producing sheets of a thickness less than 0.6 mm. containing up to 85%–90% of polymethacrylic chains and having the principal desired properties of polymethacrylic sheets, notably polish and lustre.

The following examples will serve to illustrate the invention:

*Example I*

A sheet of polyvinyl chloride measuring 700 x 1000 x 0.1 mm., plasticised with 10% by weight of octyl phthalate, is placed in a closed receptacle, which contains at the bottom liquid methylmethacrylate at a temperature of 25° C., while the temperature of the receptacle itself is maintained at about 26° to 27° C. The unsaturated methyl methacrylate vapour penetrates into the sheet of polyvinyl chloride and converts it into a soft but non-sticky sheet which, after 10 hours, has absorbed 200% of its weight of methyl methacrylate vapour. This sheet is then carefully spread on a polished glass sheet coated with a silicone-based anti-adhesive, and a second, identical sheet of polished glass is applied to its second face. This assembly is laid flat in an enclosed space having an atmosphere of nitrogen and subjected to the gamma radiation produced by bars of radio-cobalt, until it has uniformly received a dose of 1 megaroentgen, which takes about 4 hours. The glass sheets are then separated from the sheet of plastic material, and it is found that the latter consists of a sheet 0.3 mm. thick of very great transparency and having the polish, the lustre and the hardness characteristic of methacrylic resins, while being less fragile than the latter, by reason of its constitution. It consists of a grafted copolymer containing about 66% of methacrylic chains grafted on the stem polymer represented by the plasticized polyvinyl chloride which constitutes 34% of the final sheet.

The advantages of the present invention are obvious from this example, since it permits of obtaining, without encountering the difficulties of manufacture hereinbefore described, a sheet having the advantages of methacrylic sheets but with better mechanical properties than the latter and in a thickness which it is not possible to obtain by the methods heretofore known.

*Example II*

A powder consisting of grains of 3 x 3 mm. of unplasticised polyvinyl chloride is placed in an enclosed space maintained at 25° C., containing at the bottom methyl methacrylate maintained at 22° C. After 15 hours, the powder has absorbed 3 times its weight of methylmethacrylate. It has become very soft, but has not become sticky. It is extruded at a temperature of 30° C. through a flat nozzle in the form of a soft sheet 500 mm. wide and 0.1 mm. thick, which is received on an endless band of polished steel. The latter passes through a tunnel, the upper part of which consists of a film permeable to electromagnetic radiation, and in which an inert atmosphere is produced by passing a slow current of nitrogen therethrough in the direction opposite to the direction of travel of the sheet. During its travel through the tunnel, the extruded sheet undergoes for 10 minutes the action of the radiation emitted by a 500,000 electron volt particle accelerator. On leaving the tunnel, it consists of a transparent film of good mechanical strength, of which the face which was in contact with the polished metal strip is smooth and polished.

We claim:

1. Process for the production of shaped articles by irradiation of an article of a polymer swollen with a polymerisable monomer, which comprises swelling an article of polyvinyl chloride with 100–900% of its weight of monomeric methyl methacrylate by exposing it to unsaturated methyl methacrylate vapour, and subjecting the swollen article to a dose of high energy radiation which is below the minimum dose capable of causing substantial degradation of the polyvinyl chloride but sufficient to cause polymerisation of all the methyl methacrylate in the swollen article.

2. Process according to claim 1, wherein the energy of the radiation is between 0.3 and 1.4 mev.

3. Process according to claim 2, wherein the article is a film less than 0.6 mm. thick.

4. Process according to claim 3, wherein the swollen film is irradiated while in contact with at least one polished surface.

References Cited in the file of this patent

UNITED STATES PATENTS

| | | |
|---|---|---|
| 2,776,271 | Coover et al. | Jan. 1, 1957 |
| 2,841,569 | Rugg et al. | July 1, 1958 |
| 2,907,675 | Gaylord | Oct. 6, 1959 |
| 2,979,446 | Anderson | Apr. 11, 1961 |
| 2,979,447 | Levine | Apr. 11, 1961 |
| 2,983,657 | Gabilly et al. | May 9, 1961 |

FOREIGN PATENTS

| | | |
|---|---|---|
| 582,559 | Great Britain | Nov. 20, 1946 |
| 750,923 | Great Britain | June 20, 1956 |
| 1,130,099 | France | Sept. 17, 1956 |
| 1,130,100 | France | Sept. 17, 1956 |

OTHER REFERENCES

Ballantine: "Modern Plastics," pages 171–176, September 1957.

Brookhaven National Laboratory Report No. 414, pages 1–14, October 1956.